(12) United States Patent
Boukari

(10) Patent No.: US 11,978,257 B2
(45) Date of Patent: May 7, 2024

(54) DEVICE AND METHOD FOR DETECTING AND IDENTIFYING A LIVING OR NON-LIVING ENTITY

(71) Applicants: PRODOSE, Bessieres (FR); Morou Boukari, Toulouse (FR)

(72) Inventor: Morou Boukari, Toulouse (FR)

(73) Assignees: PRODOSE, Bessieres (FR); Morou Boukari, Toulouse (FR)

( * ) Notice: Subject to any disclaimer, the term of this patent is extended or adjusted under 35 U.S.C. 154(b) by 458 days.

(21) Appl. No.: 17/286,140

(22) PCT Filed: Oct. 18, 2019

(86) PCT No.: PCT/FR2019/052485
§ 371 (c)(1),
(2) Date: Apr. 16, 2021

(87) PCT Pub. No.: WO2020/079382
PCT Pub. Date: Apr. 23, 2020

(65) Prior Publication Data
US 2021/0357641 A1    Nov. 18, 2021

Related U.S. Application Data

(60) Provisional application No. 62/747,726, filed on Oct. 19, 2018.

(51) Int. Cl.
*G06V 20/00* (2022.01)
*G06T 7/70* (2017.01)
(Continued)

(52) U.S. Cl.
CPC ............ *G06V 20/54* (2022.01); *G06T 7/70* (2017.01); *G06T 11/00* (2013.01); *G10L 25/51* (2013.01)

(58) Field of Classification Search
CPC .. G08G 1/162; G08G 1/161; G08G 1/096783; G08G 1/163; G06T 7/70; G06V 20/54
See application file for complete search history.

(56) References Cited

U.S. PATENT DOCUMENTS 9,832,241 B1 * 11/2017 Hayward ............ G01C 21/367
2010/0030423 A1 * 2/2010 Nathanson ............ H04L 69/164
701/33.4

(Continued)

OTHER PUBLICATIONS

Chen, Shanzhi, et al. "Vehicle-to-everything (V2X) services supported by LTE-based systems and 5G." IEEE Communications Standards Magazine 1.2 (2017): 70-76. (Year: 2017).*

(Continued)

*Primary Examiner* — Li Liu
(74) *Attorney, Agent, or Firm* — NIXON & VANDERHYE

(57) ABSTRACT

The invention concerns a device and a method for detecting and identifying a living or non-living entity allowing these entities to be transformed into a detectable object in order to facilitate their detection, recognition and identification. For this purpose, the device comprises at least one detectable electronic housing referred to as the real entity housing (42) and at least one detection module (142), the real entity housing (42) is associated with, integrated with, incorporated with or substituted, partially or not, for the real entity to be detected and identified (48), the real entity housing (42) broadcasts, unidirectionally and as a broadcast and without dialogue and in a loop, a real or virtual image or an avatar of the entity to be detected.

26 Claims, 8 Drawing Sheets

(51) Int. Cl.
*G06T 11/00* (2006.01)
*G06V 20/54* (2022.01)
*G10L 25/51* (2013.01)

(56) References Cited

U.S. PATENT DOCUMENTS

| | | | | |
|---|---|---|---|---|
| 2010/0052944 | A1* | 3/2010 | Luke | G08G 1/161 |
| | | | | 340/902 |
| 2017/0032402 | A1* | 2/2017 | Patsiokas | G06Q 30/0207 |
| 2021/0029674 | A1* | 1/2021 | Uchiyama | H04W 72/20 |
| 2021/0357641 | A1* | 11/2021 | Boukari | G06T 7/70 |

OTHER PUBLICATIONS

K. Zheng, Q. Zheng, p. Chatzimisios, W. Xiang and Y. Zhou, "Heterogeneous Vehicular Networking: A Survey on Architecture, Challenges, and Solutions," in IEEE Communications Surveys & Tutorials, vol. 17, No. 4, pp. 2377-2396, Fourthquarter 2015, doi: 10.1109/COMST.2015.2440103. (Year: 2015).*
International Search Report for PCT/FR2019/052485 dated Feb. 25, 2020, 3 pages.
Written Opinion of the ISA for PCT/FR2019/052485 dated Feb. 25, 2020, 8 pages.
Toh et al., "Wireless digital traffic signs of the future", IET Networks, Oct. 4, 2018, vol. 8, No. 1, pp. 74-78 (Total of 5 pages).

* cited by examiner

[Fig. 1]
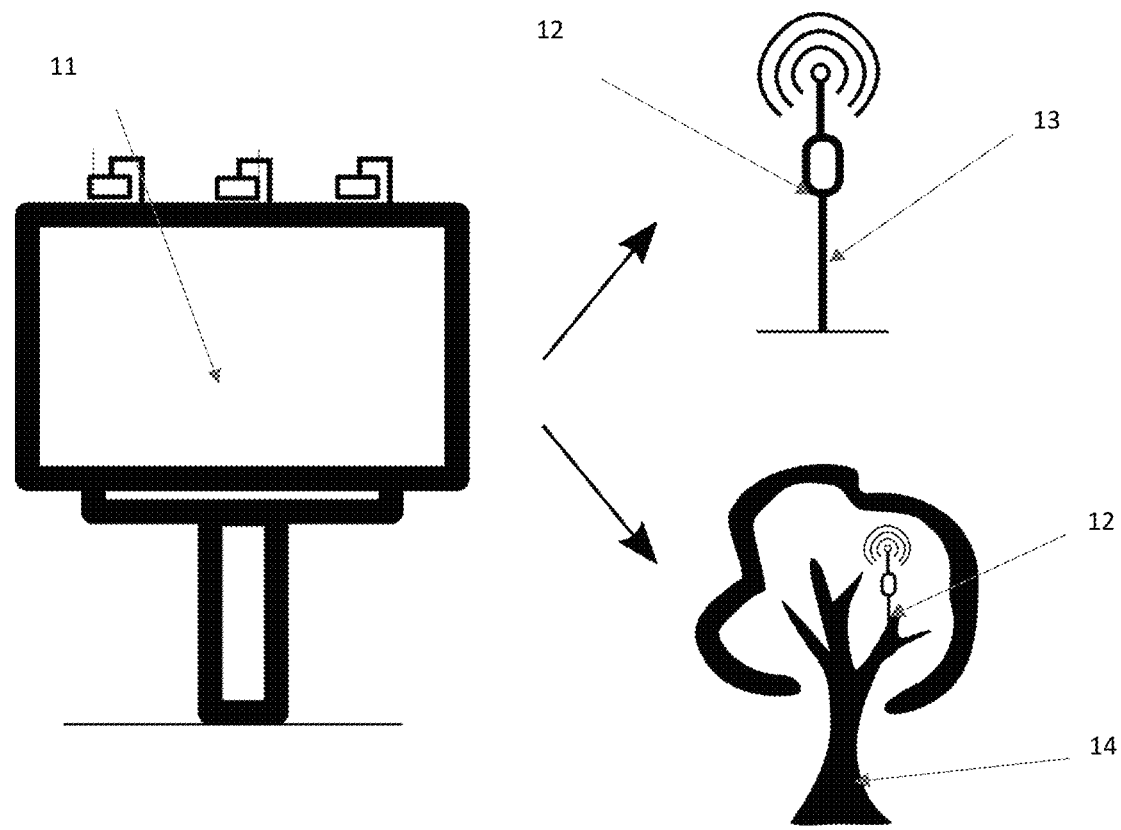

[Fig. 2]
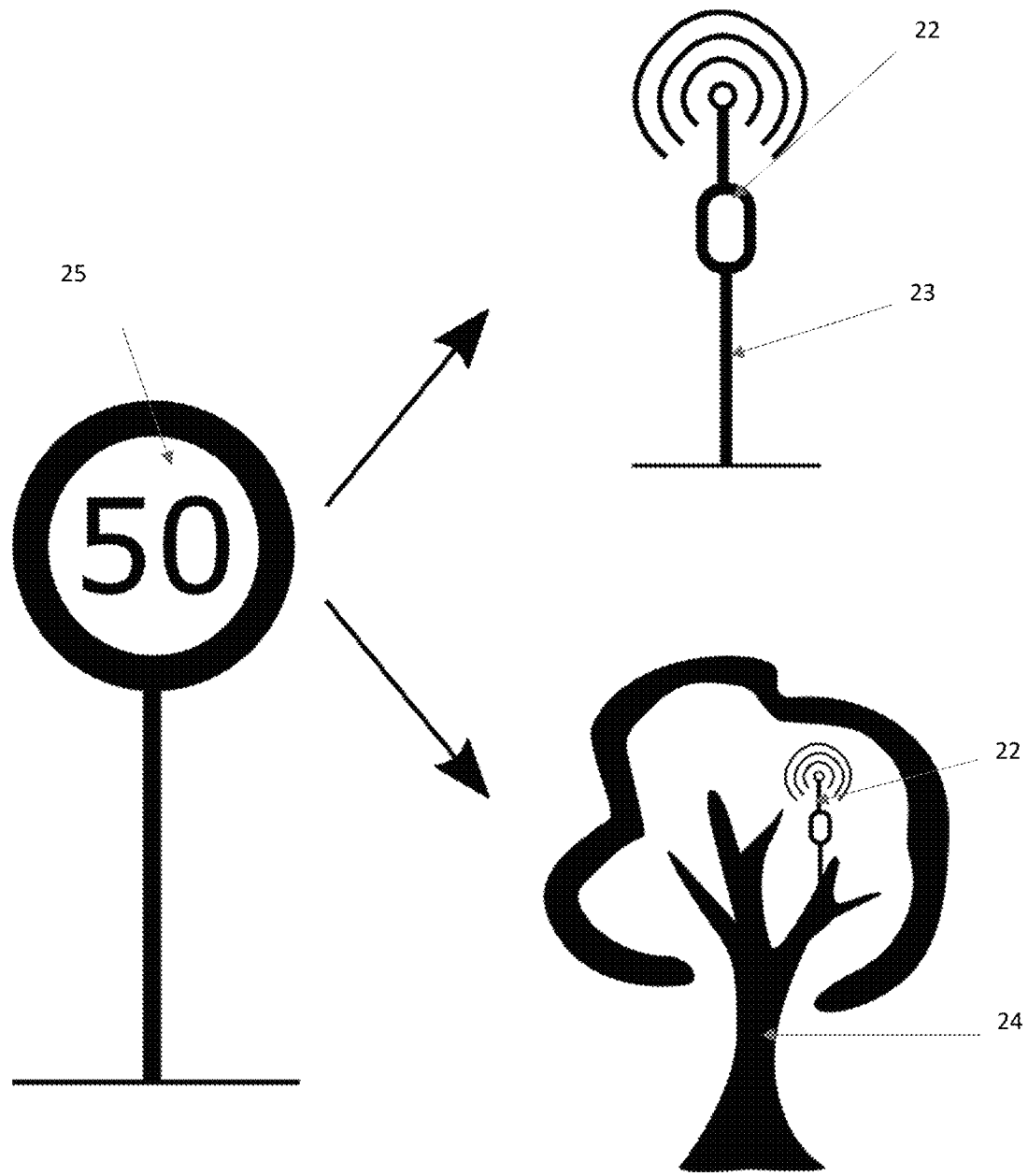

[Fig. 3]
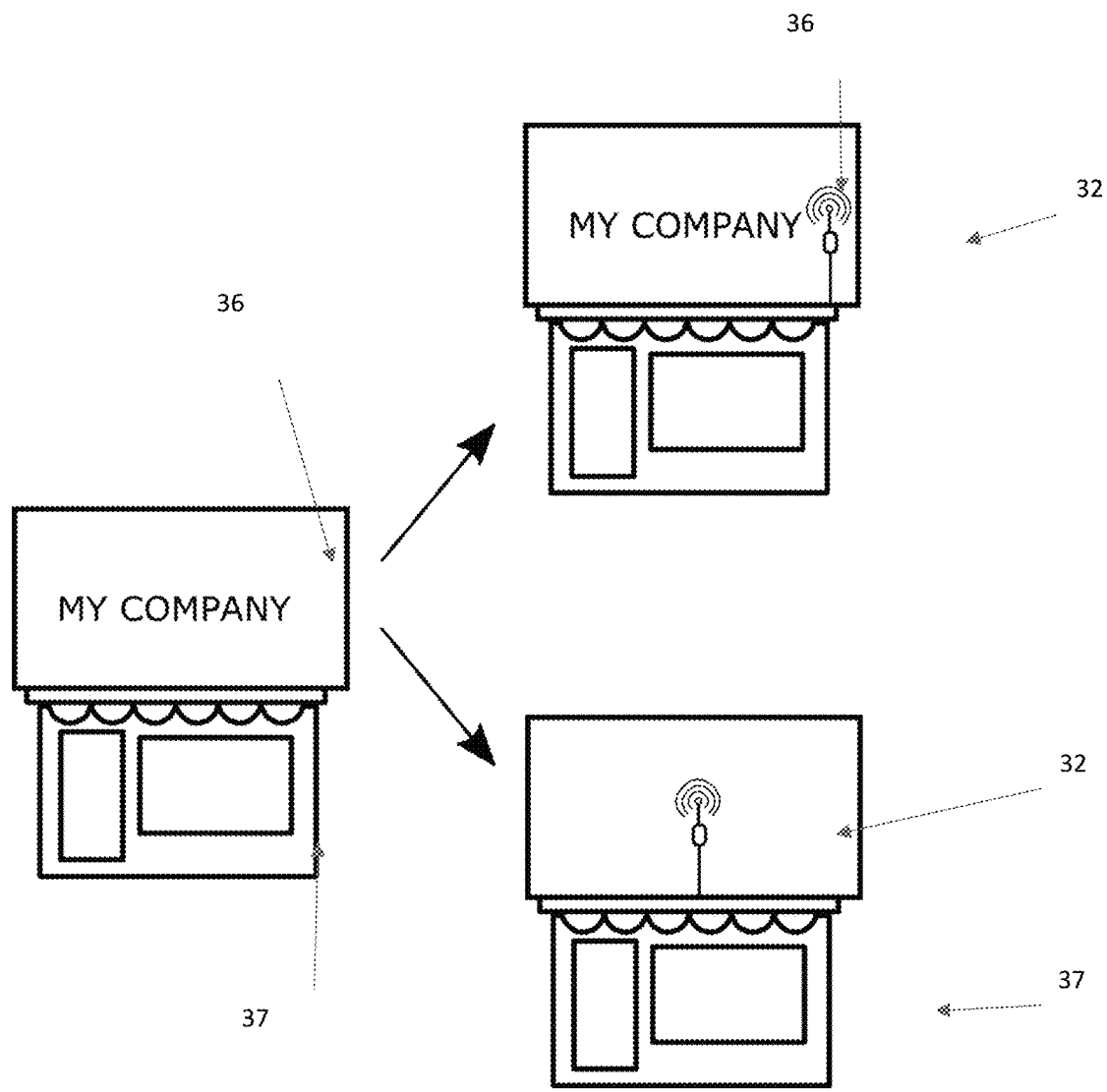

[Fig. 4]
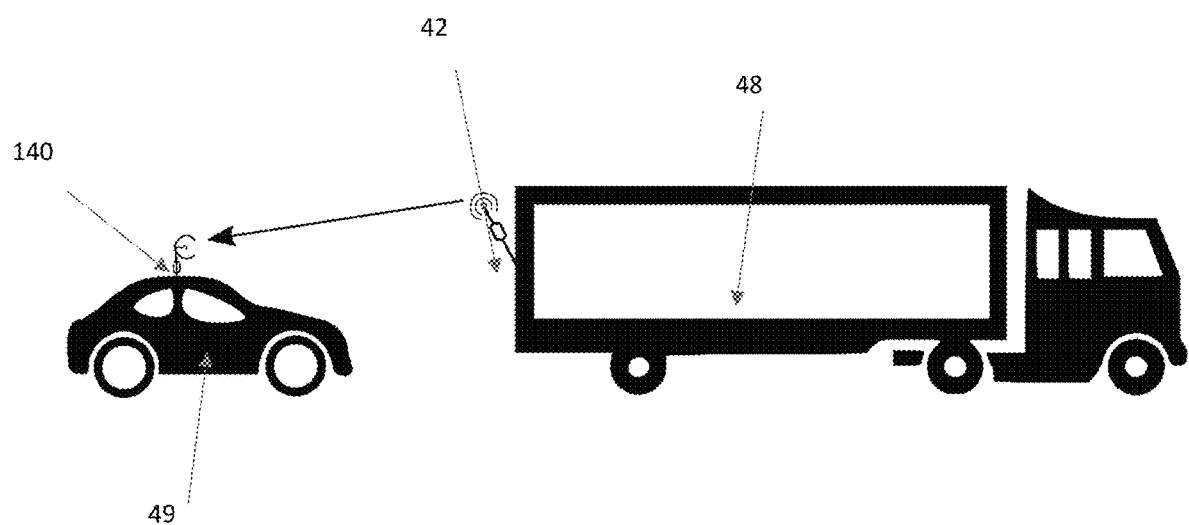

[Fig. 5]
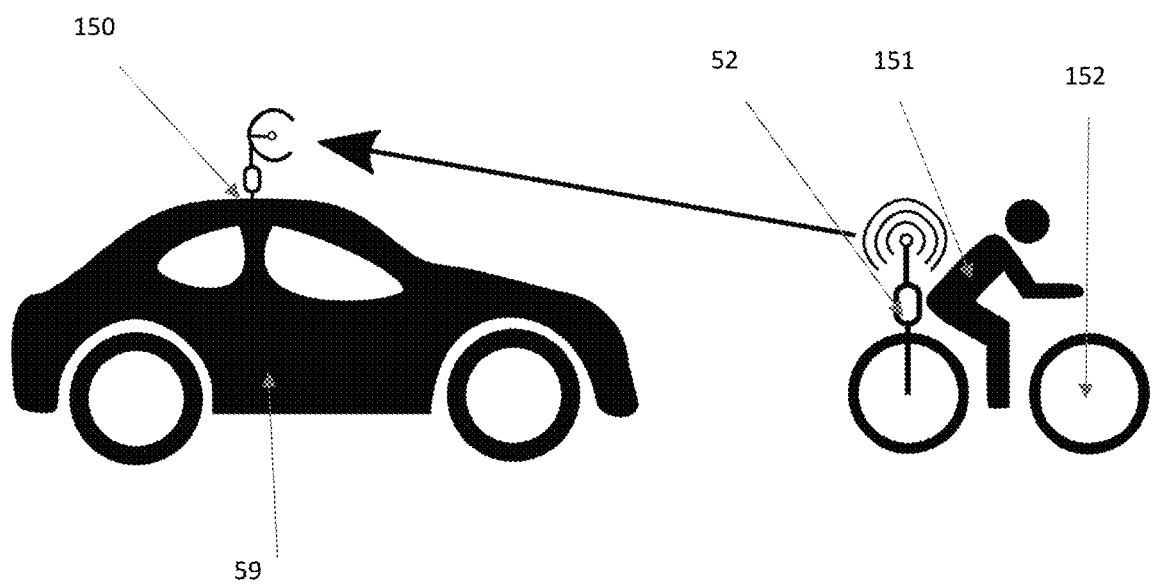

[Fig. 6]
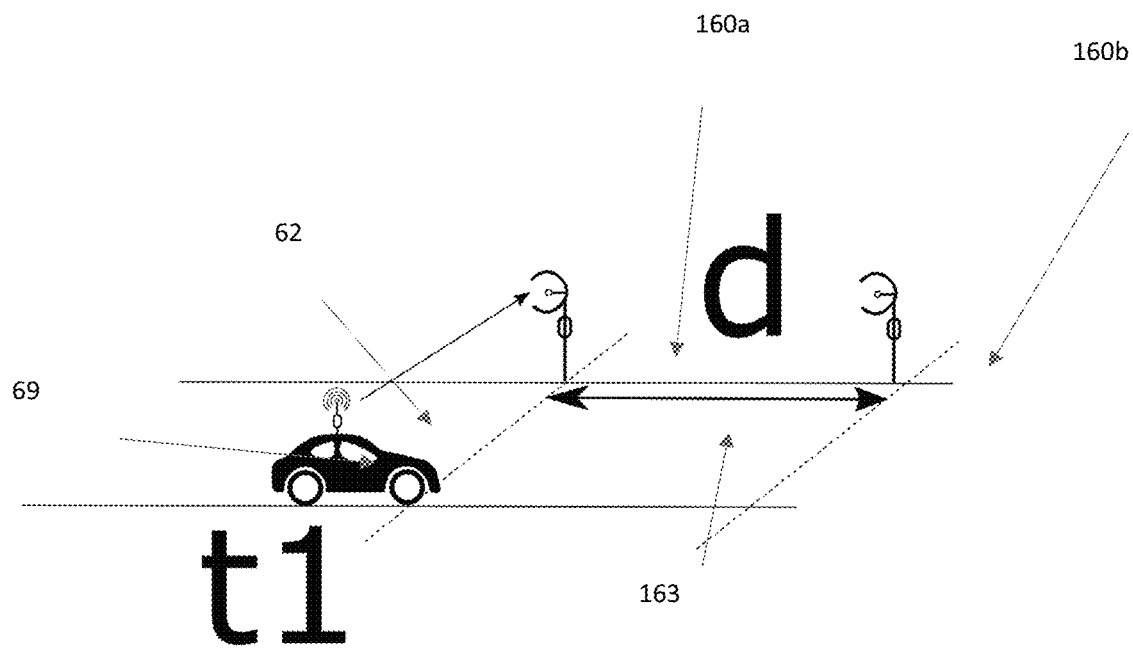
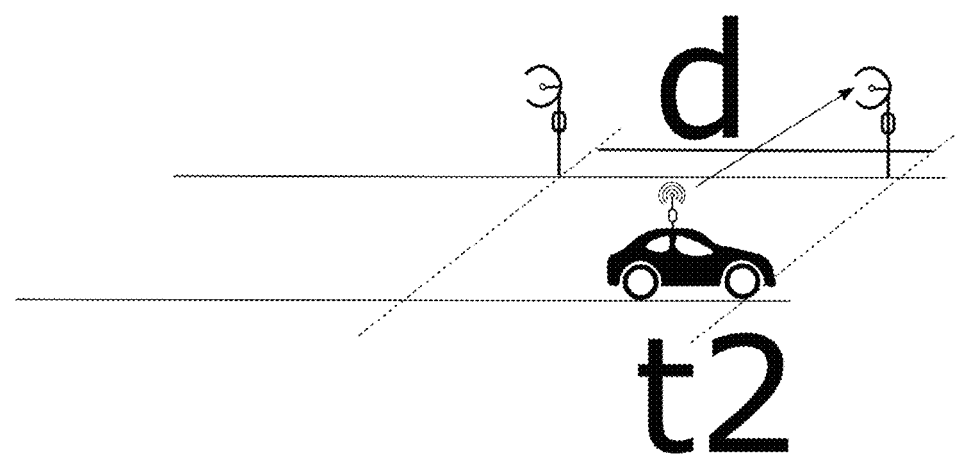

[Fig. 7]
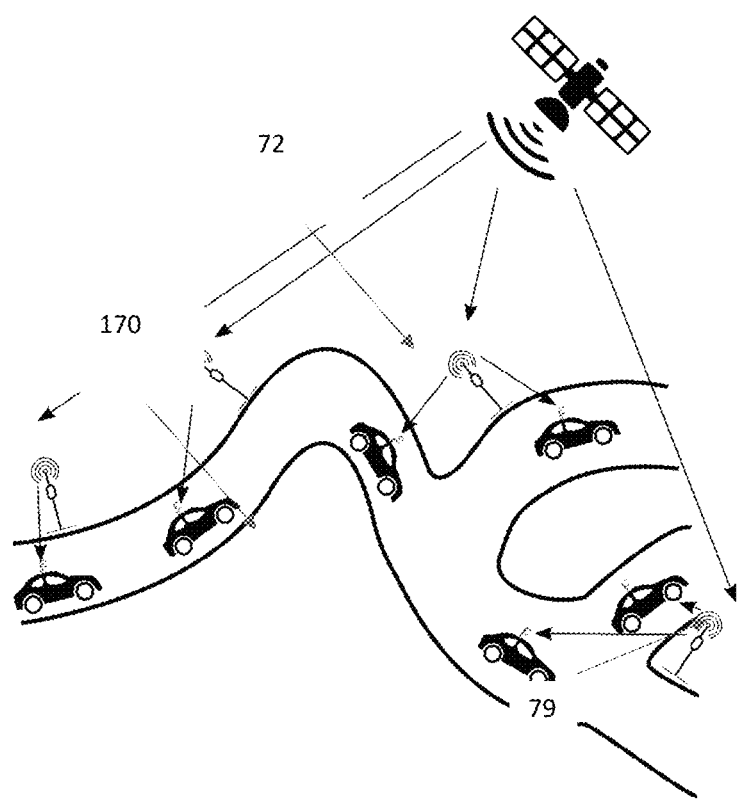

[Fig. 8]
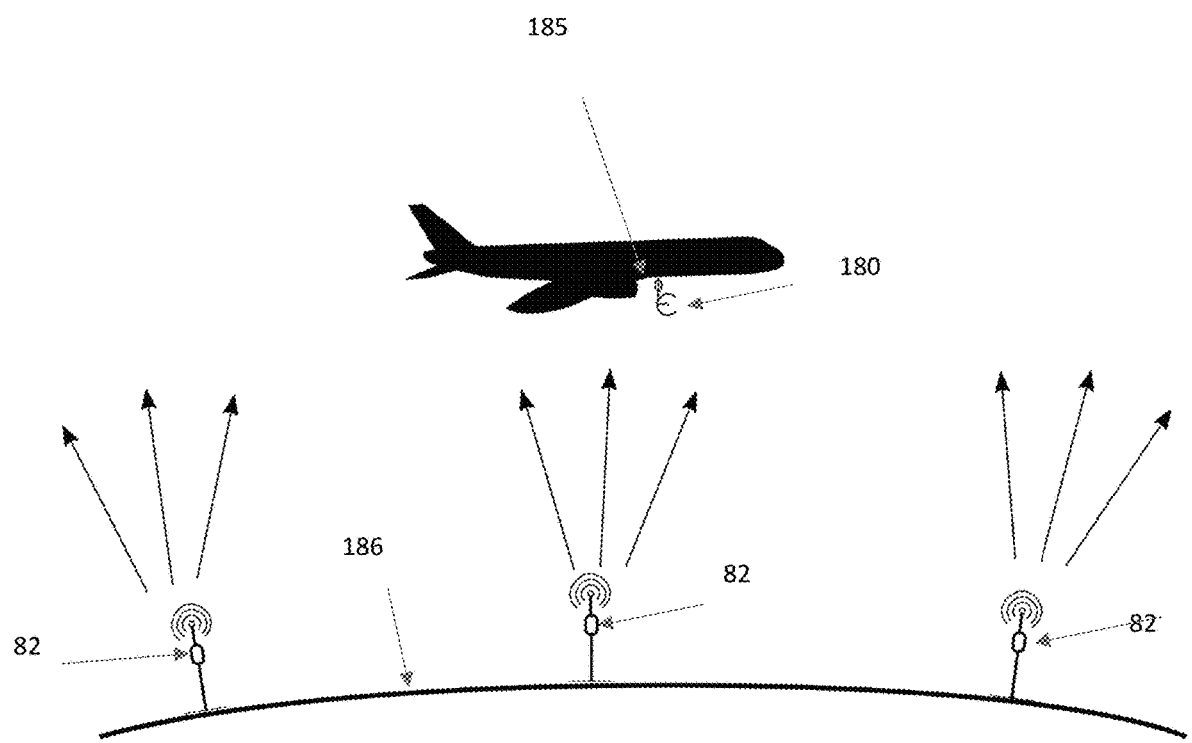

DEVICE AND METHOD FOR DETECTING AND IDENTIFYING A LIVING OR NON-LIVING ENTITY

This application is the U.S. national phase of International Application No. PCT/FR2019/052485 filed Oct. 18, 2019 which designated the U.S. and claims priority to U.S. Application No. 62/747,726 filed Oct. 19, 2018, the entire contents of each of which are hereby incorporated by reference.

FIELD OF APPLICATION OF THE INVENTION

The invention relates to improvements in the detection, identification, detection of the movement of an entity (object or living being) by a device.

DESCRIPTION OF THE PRIOR ART

Currently, there are several modes of detection and recognition of objects:
- The direct detection and recognition by human vision (direct vision by the naked human eye, recognition by the brain functions of the human being),
- The detection and the recognition by vision by a capturing information technical means such as a sensor associated with an information processing means such as a computer (use of radars, lidars, cameras, ultrasonic sensors, RFID-type radio-tag type chips associated with powerful computers provided with data processing algorithms).

These detection modes have several disadvantages.

Thus, for example, as regards the detection and the direct recognition by human vision, it is impossible to detect, to see, to recognize and to identify the objects with the naked eye when these objects are located very far and/or when the weather is very bad (fog, rain, night). Regarding the detection and recognition by technical means associated with a computer, it is known that
- radars cannot discern colors and contours,
- ultrasonic sensors have a very weak range (less than ten meters),
- lidars are insensitive to colors and can be disturbed by bad weather (rain, snow, thick fog),
- RFID chips have a very low range (less than two hundred meters),
- cameras are very sensitive to bad weather (rain, snow, thick fog, brightness).

The recognition algorithms associated with the information processing system are not completely reliable and need to be trained first with very large amounts of data and require very powerful computers.

Moreover, when they are visible, the objects to be recognized and identified have many disadvantages themselves.

It is the case for example of the objects supporting an advertising message (such as advertising boards and screens, advertising pre-signs and signs) which cause visual pollution of cities, villages and roads, which has conducted to their prohibition or their limitation in size or in number at the entrance or inside of cities and villages and their installation on blocks and buildings.

Another disadvantage of advertising boards and screens, and advertising pre-signs or signs, is the impossibility of seeing these advertising boards and signs by passengers who are located at the rear of the wheeled machines.

BRIEF DESCRIPTION OF THE INVENTION

Considering the above, the applicants conducted research aimed at facilitating the detection and identification of an entity (living being or object) in order to resolve the drawbacks of the prior art.

These researches led to the design of a device and a method ensuring the transformation of these entities into detectable object to facilitate their detection, their recognition, and their identification so as to optimize
- the exploitation of the information of their recognition for display on digital screens (fixed or mobile), or
- the use of the information of their identification and recognition for the control and the guidance of semi-autonomous machines (wheeled or flying) or autonomous machines (wheeled or flying), or
- the use of the information of their identification and recognition in order to know the possibilities of motions of the entity when it is mobile.

According to the invention, the device for detecting and identifying a living or non-living entity is remarkable in that it comprises at least one detectable electronic unit, called real entity unit, and at least one detection module, The real entity unit associates, integrates, embeds itself to the real entity unit to be detected and identified, and substitutes itself partially or not to this real entity unit, Said real entity unit broadcasts in a unidirectional manner and without dialogue and in loops, a real or virtual image or an avatar of the entity to be detected and information or attributes associated with the identity of the entity, which real entity unit has a unique digital identity and comprises:
- A storage and/or digital recording means making it possible to store a real or virtual image of the entity and/or information or attributes associated with the identity of the entity,
- A power supply internal means for powering the real entity unit,
- Remote reception means for the remote reception of the information associated with the entity, of updates of the real image or the virtual image of the entity,
- Capture means for capturing the real image of the entity with or without its associated environment,
- Broadcasting means for broadcasting in loops,
- to one or more (mobile or fixed) modules called detection modules, each equipped with:
  - Reception means for receiving the data constituted by the images and/or information broadcast by the real entity unit,
  - Temporary storage means for the temporary storage of said data,
  - Displaying and/or listening means for displaying and/or listening said data,
  - Processing means for processing the data.

Examples of real entities (with for some of them examples of associated information) to be detected are set out in a non-exhaustive way in the following list:
Living Entities:
Human beings
  Man+(child, adult, old)
  Woman+(child, adult, old)
Animals
  Dogs+breed
  Cats
  Cows
  Sheep
  etc . . .

Non-Living Entities:
Bicycle
Motorcycle+motorcycle brand
Car+car brand+dimensions
Other wheeled machines+dimensions
Airplanes+type of plane+dimensions
Train+type of train+dimensions
Other flying machines+dimensions
Buildings
Shops
Blocks
Sidewalks
Road signs+type of signs
Advertising signs+their contents
Advertising boards+their contents
Advertising pre-signs+their contents
Pedestrian crossings.

Provided the real entity unit transmits in loops, it transmits data other than visual data that can be detected so as to make it possible to detect the associated real entity and identify it.

It is no longer necessary to see the entity to detect and identify it. Moreover, it is not necessary to implement very sophisticated detection means since the entity transmits.

The device of the invention therefore overcomes the drawbacks of the prior art.

The information or attributes of the entity broadcast by the device can be of several types.

According to a preferred embodiment, a non-exhaustive list of said attributes is provided below: type of the entity, nature of the entity, name of the entity, content of the entity, dimensions of the entity, and possibilities of motions of the entity.

The term broadcast is known and designates a unidirectional broadcast to several users, here detection modules, without limitation as to the number thereof.

According to another particularly advantageous feature, the broadcast is a television-broadcast.

According to another particularly advantageous feature of the invention, the broadcast is a radio-broadcast of the sound recordings of the audio description of the entity and the information associated with the identity of the real entity to be detected.

The audio description is then part of the information or attributes associated with the entity. Radio-broadcasting requires less energy and a narrower broadcast band than a television-broadcasting.

According to another particularly advantageous feature of the invention, the broadcast information or attributes of the entity includes the position, orientation, direction of motion and speed of motion of the entity.

This information can be broadcast by sound.

According to another particularly advantageous feature of the invention, the storage means and/or recording and storage means has capacities ranging from 0.1 MB to more than 10 TB. According to another particularly advantageous feature of the invention, the power supply means is rechargeable.

According to another particularly advantageous feature of the invention, the power supply means is connected to external charging means such as solar panels, wind turbine, magnetic field means, and piezoelectric means, or to an electric grid.

According to another particularly advantageous feature of the invention, the remote reception means range from 500 m to 100,000 km. They are implemented by digital wireless link or wired link.

According to another particularly advantageous feature of the invention, the device includes transforming means for transforming the real image of the entity into a virtual image. In particular, such a feature ensures the confidentiality of the real visual image of the entity. According to another particularly advantageous feature of the invention, the television-broadcasting and/or radio-broadcasting loop is performed at frequencies ranging from 1 second to 120 seconds over very long distances beyond 500 m up to 20,000 m, which television-broadcasting and/or radio-broadcasting can be made at a rate of 100 KB/s up to more than 10 GB/s.

According to another particularly advantageous feature of the invention, the detection modules are embedded or integrated in wheeled and flying machines, in autonomous or semi-autonomous wheeled and flying machines, in portable computers of the PC and smartphone type or are carried by human beings.

According to another particularly advantageous feature of the invention, the detecting means for detecting the exact position of the object, the orientation of the object, the direction of motion of the object and the speed of motion of the object are constituted by GPS sensors, inertial and gyroscopic sensors and accelerometers.

It is then understood that an advertising board type entity can be broken down between the technical means supporting the advertising message and the supported message. The invention makes it possible to transform the technical means supporting the advertising message into a simple post or even to replace or implement this technical means by another entity such as a tree which will serve as a support means for supporting the real entity unit that broadcasts the advertising message.

Such a solution leads to the elimination of visual pollution related to the installation of advertising boards, advertising pre-signs or signs at the entrance or inside cities and villages or along land roads and railways.

It is the same for road signs.

The detection module and/or the real entity unit can be integrated into backpacks, handbags, suitcases, bicycle and motorcycle helmets in view of their use by human beings.

The detection module and/or the real entity unit can have as a technical basis a smartphone (mobile phone) modified for the implementation of the new functions of the device managed, for example, by a dedicated application, the driving programs for wheeled vehicles and the safety programs for these vehicles will be compatible with this mobile phone.

According to another feature, the detection module and/or the real entity unit consist of a smartphone (mobile phone) modified for the implementation of the new functions of the device managed for example by a dedicated application, the driving programs for wheeled vehicles and the safety programs for these vehicles will be compatible with this mobile phone.

In the context of guiding, self-guiding and control of autonomous or semi-autonomous machines, the information received by the detection module from the so-called real object device makes it possible to act on the controls of the machines (steering, acceleration, braking).

According to another particularly advantageous feature of the invention, the real entity unit includes detecting means for detecting the exact position, orientation, direction of motion and speed of motion of the entity.

According to another particularly advantageous feature of the invention, the detection module includes a stopwatch making it possible to determine the connection time of the detection module to the real entity unit.

According to another particularly advantageous feature of the invention, the data processing means for the processing of the data of the detection module communicate with systems for guiding and control flying and wheeled machines.

Another object of the invention is a method of using the device, which is remarkable in that it consists in:

transforming the real object to be detected (fixed or mobile, inert or living) into another real object detectable by integration or incorporation to, or by association with, the real object to be detected of an electronic unit, called real entity unit, or by substitution of part or all of the real object to be detected by an electronic unit, called real entity unit, which device called real object making it possible to television-broadcast, in a unidirectional manner and without dialogue and in loops, a real or virtual image or avatar of the type of the real object to be detected (human beings, animals, bicycles, motorbikes, wheeled machines, flying machines, advertising boards, advertising pre-signs, advertising signs, road signs), and information (attributes) associated with the identity of the real object to be detected (type of the object, nature of the object, name of the object, content of the object, dimensions of the object) and/or which real entity unit making it possible to radio-broadcast, in a unidirectional manner and without dialogue and in loops, sound recordings of the audio description of the real object to be detected and information associated with the identity of the real object to be detected, which device called real entity has a unique digital identity and comprises:

A storage and/or digital recording means making it possible to store a real or virtual image of the type of the real object to be detected (human beings, animals, bicycles, motorbikes, wheeled machines, flying machines, advertising boards, advertising pre-signs, advertising signs, road signs) and information (attributes) associated with the identity of the real object to be detected (type of the object, nature of the object, name of the object, content of the object, dimensions of the object) and/or which storage means making it possible to store and/or to record and to store the audio description of the real object to be detected and information associated with the identity of the real object to be detected, and which storage means and/or recording and storage means has capacities ranging from 0.1 MB to more than 10 TB, An internal electric power supply means for powering the object device, which power supply means can be rechargeable or not and which electric power supply means can be connected to external charging means such as solar panels, wind turbine, magnetic field means, piezoelectric means or to a power grid, Remote reception means for remote reception (ranging from 500 m to more than 100,000 km) by digital wireless link or by wired link of information associated with the object, of updates of the real image or of the virtual image of the object, Capturing means for capturing the real image of the real object to be detected with or without its associated environment and transforming means for transforming the real image of the object to be detected into a virtual image making it possible to keep the confidentiality of the real visual image of the real object to be detected, Broadcasting means making it possible to broadcast, in a unidirectional manner and without dialogue and in loops, a real or virtual image or an avatar of the type of the real object to be detected (human beings, animals, bicycles, motorbikes, wheeled machines, flying machines, advertising boards, advertising pre-signs, advertising signs, road signs) and information (attributes) associated with the identity of the real object to be detected (type of the object, nature of the object, name of the object, content of the object, dimensions of the object) with or without the position, orientation of the object, direction of motion of the object and speed of motion of the object, and/or which real entity unit makes it possible to radio-broadcast, in a unidirectional manner and without dialogue and in loops, sound recordings of the audio description of the real object to be detected and information associated with the identity of the real object to be detected with or without the information relating to the position, orientation of the object, direction of motion of the object and speed of motion of the object, and which television-broadcasting and/or radio-broadcasting loop is performed at frequencies ranging from 1 second to 120 seconds over very long distances ranging from 500 m to 20000 m, which television-broadcasting and/or radio-broadcasting may be performed at a rate of 100 KB/s up to a rate of more than 10 GB/s.

in broadcasting, in a unidirectional manner and without dialogue and in loops, a real or virtual image or an avatar of the real object to be detected and information (attributes) associated with the identity of the real object to be detected with or without the position, orientation of the object, direction of motion of the object and speed of motion of the object, towards one or more modules called detection modules (mobile or fixed) and/or in radio-broadcasting, in a unidirectional manner and without dialogue and in loops, sound recordings of the audio description of the real object to be detected and information associated with the identity of the real object to be detected, with or without the position, orientation of the object, direction of motion of the object and speed of motion of the object, towards one or several modules called detection modules (mobile or fixed), which detection modules are embedded or integrated in wheeled or flying machines, autonomous or semi-autonomous wheeled or flying machines, in portable computers such as PCs and smartphones or are carried by human beings, and which detection modules are each provided with:

Reception means for the reception of the real or virtual images of the real object to be detected associated with the various complementary information (attributes of the real object) and/or for the reception of the sound recordings of the audio description of the real object to be detected and of the information associated with the identity of the real object to be detected, Storage means for the temporary storage of the real or virtual images of the real object to be detected associated with the various complementary information (attributes of the real object) and/or of the sound recordings of the audio description of the real object to be detected and the information associated with the identity of the real object to be detected, Displaying or projecting means for displaying or projecting the real or virtual images of the real object to be detected associated with the various complementary information (attributes of the real object) and/or listening means for listening to the sound recordings of the audio description of the real object to be detected and the information associated with the identity of the real object to be detected and received by the detection module, Processing means for processing the real or virtual images of the real object to be detected associated with the various complementary information (attributes of the real object).

The detection module can connect to one or to several units at the same time, called real object units, with connection times ranging from 2 seconds to 10 minutes and receives the real or virtual image of the real object to be detected with all the information of its identification associated, with or without the position, orientation of the object, direction of motion of the object and speed of motion of the object, and displays them on the display means fitted to the detection module and/or directs information about the identity and other attributes of the real object identified, with or without the position, orientation of the object, direction of motion of the object and speed of motion of the object, towards the control and guidance systems of semi-autonomous machines (wheeled or flying) or autonomous machines (wheeled or flying), and/or which detection module can be connected to one or to several units at the same time, called real object units, with connection times ranging from 2 seconds to 10 minutes and receives sound information of the audio description of the real object to be detected and information associated with the identity of the real object to be detected, with or without the sound information of the position, orientation of the object, direction of motion of the object and speed of motion of the object, and directs them towards the sound listening means equipping the detection module and/or directs the information about the identity and other attributes of the real object identified, with or without information on the position, orientation of the object, direction of motion of the object and speed of motion of the object, towards the sound information processing systems for the purpose of controlling and guiding semi-autonomous (wheeled or flying) machines or autonomous (wheeled or flying) machines.

In the context of the transformation of the real entity (in the case of advertising boards, signs and pre-signs) by total substitution, the method consists in replacing the real entity with another real object, for example of the type of a natural or synthetic tree, natural or synthetic flowers with incorporation to the new replacement entity of the device called real entity device.

According to another particularly advantageous feature, the method consists in equipping the real entity unit with the means making it possible to detect the exact position of the object, the orientation of the object, the direction of motion of the object and the speed of motion of the object.

According to another particularly advantageous feature, the image-processing means of the detection modules communicate with the guidance and control systems and/or with voice recognition means equipped with artificial intelligence and processing means for processing received sound information which communicate with the guidance and control systems of flying and wheeled machines.

According to another particularly advantageous feature, the method consists in equipping the detection module with a stopwatch making it possible to determine the connection time of the detection module to the device called real object.

According to another particularly advantageous feature, the method consists in equipping a section of road with detection modules placed along the road and separated by a distance, and in calculating the speed of a vehicle moving on the said road and equipped with a real entity unit by determining the duration of the movement of the vehicle between two detection modules.

This method makes it possible to integrate and to better manage the detection of the motion of objects (mobile or fixed) living or inert, located or evolving along or beside or under the land, sea, rail and air navigation routes or of objects in motion on these navigation routes.

According to another particularly advantageous feature, the method consists in:

Identifying all possible movements that the entity could make,

Associating to each movement that the entity could make a sound or visual description and/or a code Associating to each movement that the entity could make, one or several sensors making it possible to detect or measure the motion of the entity Equipping the entity with an electronic unit containing the sensors associated with all the movements identified and that the entity could make Detecting through the sensors the real movement made by the entity, Broadcasting the description and/or the code associated with the motion of the entity detected by the sensors associated with the motion of the entity to a detection module using means fitted to the electronic unit and making it possible to television-broadcast and/or radio-broadcast, in a unidirectional manner and without dialogue and in loops, the code or description associated with the motion of the entity, and which television-broadcast and/or radio-broadcast loop is performed at frequencies ranging from 1 second to 120 seconds over very long distances ranging from 500 m to up to 20,000 m, which television-broadcasting and/or radio-broadcasting can be done at a rate of 100 KB/s up to more than 10 GB/s and which detection module is equipped with the reception means for receiving the audio or visual description and/or the code associated with the motion of the entity and which description is broadcast on the sound diffusion means equipping the detection module or displayed on the display means equipping the detection module or which code is directed towards the operating means for the purpose of decoding and of association with a movement through a database containing the codes associated with each possible feasible movement and which description and/or code associated with the movement can be used for the purpose of controlling or auto-controlling control means for the motion of the entity.

The types of possible movements are set out in a non-exhaustive manner in the following list:

Forward
Reverse
Left turn
Right turn
Traffic direction
Traffic way
Braking
Slowdown
Lane cut-out
Lane cut-in
Reverse traffic
Parking The applications considered are numerous, among them:
Advertising in wheeled machines (land machines, trains, boats) and/or flying machines (aircraft),
Advertising for pedestrian,
Guidance, auto-guiding and control of wheeled and flying machines,
Road signs,
Road navigation,
Enforcement of traffic violations.

Since the basic concepts of the invention have been explained above in their most basic form, other details and features will be more clearly apparent when reading the following description and considering the appended drawings.

BRIEF DESCRIPTION OF DRAWINGS

FIG. 1 is a schematic drawing illustrating the transformation of an advertising board replaced by a real entity unit of a device in accordance with the invention;

FIG. 2 is a schematic drawing illustrating the transformation of a road sign replaced by a real entity unit of a device in accordance with the invention;

FIG. 3 is a schematic drawing illustrating the transformation of a store equipped replaced by a real entity unit of a device in accordance with the invention;

FIG. 4 is a schematic drawing illustrating the implementation of the device on a truck and a car;

FIG. 5 is a schematic drawing illustrating the implementation of the device on a bicycle and a car;

FIG. 6 is a schematic drawing illustrating the implementation of the device on a car and a roadway for the purpose of managing the speed of the car;

FIG. 7 is a schematic drawing illustrating the implementation of the device on a plurality of cars and a roadway;

FIG. 8 is a schematic drawing illustrating the implementation of the device on a plurality of cars and a roadway.

DESCRIPTION OF EMBODIMENTS IN RELATION TO THE DRAWINGS

FIG. 1 illustrates an example of transformation by total substitution of an advertising board (11) into a post (13) equipped with an electronic unit called real entity unit (12) or into a tree (14) equipped with an electronic unit called real entity unit (12).

FIG. 2 illustrates an example of transformation by total substitution of a road sign (25) into a post (23) equipped with an electronic unit called real entity unit (22) or into a tree (24) equipped with an electronic unit called real entity unit (22).

FIG. 3 illustrates an example of transformation by incorporating into a sign (36) of a store (37) an electronic unit called real entity unit (32) or by replacing or totally substituting the sign (36) of the store (37) by an electronic unit called real entity unit (32).

FIG. 4 illustrates an example of detection of a semi-trailer truck (48) equipped with a device called real entity unit (42) by a car (49) equipped with a detection module (140).

The information received by the detection module (140) fitted to the car (49) is for example: Detection of a 38-ton semi-trailer truck of the FORD brand moving in the direction of motion of the car at 100 meters.

FIG. 5 illustrates an example of detection of a cyclist (151) and his bicycle (152) equipped with a device called real entity unit (52) by a car (59) equipped with a detection module (150). The information received by the detection module (150) fitted to the car (59) is for example: Detection Young man on a 2.5 inches DECATLON brand bicycle moving in the direction of motion of the car at 400 meters.

FIG. 6 illustrates an example of use of the method for detecting the excess speed of a car (69) equipped with the device called real entity unit, traveling on a section of road (163) equipped with two detection modules (160a) and (160b) placed along the road (163) and separated by a distance (d). The two detection modules (160a) and (160b) are connected to a central data processing and issuance of traffic violation reports. The speed on the section (d) of the road (163) is limited by the local authorities to a value VL. At time t1, the car (69) arrives at the detection module (160a) which receives the information sent by the device called real entity unit (62) equipping the car (69) and which measures the time t1. The information received is for example red CITROEN C5 car registration 400VB75 owner Mr. DuPONT domiciled at 45 rue radar—75000 PARIS France.

At time t2, the car (69) arrives at the detection module (160b) which receives the information sent by the device called real entity unit (62) that equips the car (69) and measures the time t2. The information received is for example red CITROEN C5 car registration 400VB75 owner Mr. DuPONT domiciled at 45 rue Radar—75000 PARIS France. The times t1 and t2 are sent to the data processing center as well as the information about the car and the owner. The time difference t2−t1 is calculated by the data processing center. If the car is over-speeding, the time difference t2−t1 is less than d/L and a speeding report is issued and a fine is sent to Mr. DuPONT at the address indicated.

FIG. 7 shows several cars (79) equipped with detection modules (170) traveling on road networks equipped, in a mesh arrangement, with a plurality of units called real entity units (72). FIG. 8 shows an aircraft (185) equipped with a detection module (180) flying over a territory (186) on which are installed several units called real entity units (2) replacing advertising boards and sending advertising regarding commercial and tourism activities in the area being flown to passengers (unrepresented) on the aircraft (185).

It is understood that the device and method just described and depicted above have been described with a view to disclosure rather than limitation. Of course, various adjustments, modifications and improvements may be made to the above examples without departing from the scope of the invention.

The invention claimed is:

1. A device for detecting and identifying a living or non-living entity, comprising:
at least one detectable electronic unit called a real entity unit (12, 22, 32, 42) equipped on an element (13, 14, 23, 24, 36, 37, 48) that is to be detected and identified; and
at least one detection module (140) equipped on another element (49) configured to detect the real entity unit (42),
wherein said real entity unit (12, 22, 32, 42) broadcasts in a unidirectional manner and without dialogue and in loops, a real or virtual image or an avatar of the entity to be detected and information or attributes associated with an identity of the entity,
wherein the real entity unit (12, 22, 32, 42) has a unique digital identity and comprises:
A storage and/or digital recording means making it possible to store a real or virtual image of the entity and/or information or attributes associated with the identity of the entity, A power supply internal means for powering the real entity unit, Remote reception means for a remote reception of information associated with the entity, of updates of the real image or the virtual image of the entity, Capture means for capturing the real image of the entity with or without its associated environment, Broadcasting means for broadcasting in loops,
to one or more mobile or fixed modules called detection modules (140), each equipped with:

Reception means for receiving data constituted by the images and/or information broadcast by the real entity unit, Temporary storage means for the temporary storage of said data, Displaying and/or listening means for displaying and/or listening said data, Processing means for processing the data.

2. The device of claim 1, wherein the broadcast is a television-broadcast.

3. The device of claim 1, wherein the broadcast is a radio-broadcast of sound recordings of an audio description of the entity and the information associated with the identity of the real entity to be detected.

4. The device of claim 1, wherein an audio description of the real entity is an information or attribute associated with the entity.

5. The device of claim 1, wherein the broadcast information or attribute of the entity includes a position, orientation, direction of motion and speed of motion of the entity.

6. The device of claim 1, wherein the storage means and/or recording and storage means has capacities ranging from 0.1 MB to more than 10 TB.

7. The device of claim 1, wherein the power supply means is rechargeable.

8. The device of claim 1, wherein the power supply means is connected to external charging means such as solar panels, wind turbine, magnetic field means, piezoelectric means or to an electrical grid.

9. The device of claim 1, wherein the remote reception means range from 500 m up to 100,000 km.

10. The device of claim 1, further comprising transforming means for transforming the real image of the entity into a virtual image.

11. The device of claim 1, wherein television-broadcast and/or radio-broadcast loop is performed at frequencies ranging from 1 second to 120 seconds over very long distances ranging from 500 m to up to 20,000 m, wherein the television-broadcast and/or radio-broadcast can be made at a rate of 100 KB/s up to more than 10 GB/s.

12. The device of claim 1, wherein the detection modules are embedded or integrated in wheeled and flying machines, in autonomous or semi-autonomous wheeled and flying machines, in PC-type portable computers and smartphone or are carried by human beings.

13. The device of claim 1, wherein the detecting means for detecting an exact position of the object, an orientation of the object, a direction of motion of the object and a speed of motion of the object are constituted by GPS sensors, inertial and gyroscopic sensors and accelerometers.

14. The device of claim 1, wherein the detection module and/or the real entity unit are integrated into backpacks, handbags, suitcases, bicycle and motorcycle helmets in view of their use by human beings.

15. The device of claim 1, wherein the detection module and/or the real entity unit consist of a smartphone (mobile phone) modified for the implementation of new functions of the device managed, for example, by a dedicated application, driving programs for wheeled vehicles and safety programs for these vehicles will be compatible with the mobile phone.

16. The device of claim 1, further comprising detecting means for detecting an exact position, orientation, direction of motion and speed of motion of the entity.

17. The device of claim 1, wherein the data processing means of the detection module communicate with systems for guiding and controlling flying and wheeled machines.

18. The device of claim 1, wherein the detection module includes a stopwatch making it possible to determine a connection time of the detection module to the real entity unit.

19. A method for detection and identification of a living or not living entity, comprising the steps of:
transforming a real object to be detected (fixed or mobile, inert or living) into another real object detectable by integration or incorporation to, or by association with, the real object to be detected of an electronic unit, called real entity unit, or by substitution of part or all of the real object to be detected by an electronic unit, called real entity unit, wherein the device called real object makes it possible to television-broadcast, in a unidirectional manner and without dialogue and in loops, a real or virtual image or an avatar of a type of the real object to be detected (human beings, animals, bicycles, motorbikes, wheeled machines, flying machines, advertising boards, advertising pre-signs, advertising signs, road signs) and information (attributes) associated with an identity of the real object to be detected (type of the object, nature of the object, name of the object, contents of the object, dimensions of the object) and/or wherein the real entity unit makes it possible to radio-broadcast, in a unidirectional way and without dialogue and in loops, sound recordings of an audio description of the real object to be detected and information associated with the identity of the real object to be detected, wherein the device called real entity has a unique digital identity and comprises:
A storage and/or digital recording means making it possible to store a real or virtual image of the type of the real object to be detected (human beings, animals, bicycles, motorbikes, wheeled machines, flying machines, advertising boards, advertising pre-signs, advertising signs, road signs) and information (attributes) associated with the identity of the real object to be detected (type of object, nature of the object, name of the object, content of object, dimensions of the object) and/or wherein the storage means makes it possible to store and/or to record and store the audio description of the real object to be detected and information associated with the identity of the real object to be detected, and wherein the storage means and/or recording and storage means has capacities ranging from 0.1 MB to more than 10 TB, An internal electric power supply means for powering the object device, wherein the power supply means can be rechargeable or not and wherein the electric power supply means can be connected to external charging means such as solar panels, wind turbine, magnetic field means, piezoelectric means, or to a power grid, Remote reception means for remote reception ranging from 500 m to 100,000 km by digital wireless link or by wired link of information associated with the object, updates of the real image or of the virtual image of the object,
Capturing means for capturing the real image of the real object to be detected with or without its associated environment and transforming means for transforming the real image of the object to be detected into a virtual image making it possible to keep the confidentiality of the real visual image of the real object to be detected,
Means for detecting the exact position of the object, the orientation of the object, the direction of motion of the object and the speed of motion of the object,
Broadcasting means making it possible to broadcast, in a unidirectional manner and without dialogue and in loops, a real or virtual image or an avatar of the type of the real object to be detected (human beings, animals, bicycles, motorbikes, wheeled machines, flying machines, advertising boards, advertising pre-signs, advertising signs, road signs) and information or attributes associated with the identity of the real object to be detected (type of the object, nature of the object, name of the object, content of the object, dimensions of the object) with or without the position, orientation of the object, direction of motion of the object and speed of motion of the object and/or wherein the real entity unit makes it possible to radio-broadcast, in a unidirectional manner and without dialogue and in loops, sound recordings of the audio description of the real object to be detected and information associated with the identity of the real object to be detected with or without the information relating to the position, orientation of the object, direction of motion of the object and speed of motion of the object, and wherein the television-broadcast and/or radio-broadcast loop is performed at frequencies ranging from 1 second to 120 seconds over very long distances ranging from 500 m to 20000 m, wherein the television-broadcasting and/or radio-broadcasting may be performed at a rate of 100 KB/s up to a rate of more than 10 GB/s,
in television-broadcasting, in a unidirectional manner and without dialogue and in loops, a real or virtual image or an avatar of the real object to be detected and information (attributes) associated with the identity of the real object to be detected with or without the position, orientation of the object, direction of motion of the object and speed of motion of the object, towards one or several modules called detection modules (mobile or fixed), and/or in radio-broadcasting, in a unidirectional manner and without dialogue and in loops, sound recordings of the audio description of the real object to be detected and information associated with the identity of the real object to be detected, towards one or several modules called detection modules (mobile or fixed), wherein the detection modules are embedded or integrated in wheeled and flying machines, in autonomous or semi-autonomous wheeled and flying machines, in portable computers such as PCs and smartphones or are carried by human beings and wherein the detection modules are each provided with:
Reception means for the reception of the real or virtual images of the real object to be detected associated with various complementary information (attributes of the real object) and/or for the reception of the sound recordings of the audio description of the real object to be detected and of the information associated with the identity of the real object to be detected,
Storage means for the temporary storage of the real or virtual images of the real object to be detected associated with various complementary information (attributes of the real object) and/or of the sound recordings of the audio description of the real object to be detected and the information associated with the identity of the real object to be detected,
Displaying or projecting means for displaying or projecting the real or virtual images of the real object to be detected associated with various complementary information (attributes of the real object) and/or listening means for listening to the sound recordings of the audio description of the real object to be detected and the information associated with the identity of the real object to be detected and received by the detection module,
Processing means for processing the real or virtual images of the real object to be detected associated with the various complementary information attributes of the real object,
wherein the detection module can connect to one or to several unites at a time, called real object units, with connection times ranging from 2 seconds to 10 minutes and receives the real or virtual image of the real object to be detected with all the information of its identification associated, with or without the position, orientation of the object, direction of motion of the object and speed of motion of the object, and displays them on the display means fitted to the detection module and/or directs information about the identity and other attributes of the real object identified, with or without the position, orientation of the object, direction of motion of the object, and speed of motion of the object towards the control and guidance systems of semi-autonomous wheeled or flying machines or autonomous wheeled or flying machines, and/or wherein the detection module can connect to one or to several units at the same time, called real object units, with connection times ranging from 2 seconds to 10 minutes and receives sound information of the audio description of the real object to be detected and information associated with the identity of the real object to be detected, with or without the sound information of the position, orientation of the object, direction of motion of the object and speed of motion of the object, and directs them towards the sound listening means equipping the detection module and/or directs the information about the identity and the other attributes of the real object identified, with or without the information on the position, orientation of the object, direction of motion of the object and speed of motion of the object, towards the sound information processing systems for the purpose of controlling and guiding semi-autonomous wheeled or flying machines or autonomous wheeled or flying machines.

20. The method according to claim 19, wherein, in the context of the transformation of the entity (in the case of advertising boards, signs and pre-signs) by total substitution, the entity can be replaced by another entity, of the type of a natural or synthetic tree, natural or synthetic flowers with incorporation of said real entity unit to the new replacement entity.

21. The method according to claim 19, wherein, in the context of guiding, self-guiding and control of autonomous or semi-autonomous machines, the information received by the detection module from the real entity unit makes it possible to act on the controls of the machines (steering, acceleration, braking).

22. The method according to claim 19, further comprising equipping the real entity unit with means making it possible to detect the exact position of the object, the orientation of the object, the direction of motion of the object and the speed of motion of the object.

23. The method according to claim 19, wherein the image processing means of the detection modules communicate with the guidance and control systems and/or voice recognition means provided with artificial intelligence and processing means for processing received sound information, which communicate with the guidance and control systems of flying and wheeled machines.

24. The method according to claim 19 further comprising equipping the detection module with a stopwatch making it possible to determine the connection time of the detection module to the device called real object.

25. The method according to claim 19 further comprising equipping a section of road (163) with detection modules (160a and 160b) placed along the road (163) and separated by a distance, and in calculating the speed of a vehicle (69) traveling on said road and equipped with a real entity unit (62) by determining the duration of the travel of the vehicle (69) between two detection modules.

26. A method for detection and identification of a living or non-living entity, comprising:
   Identifying all possible movements that the entity could make,
   Associating to each movement that the entity could make a sound or visual description and/or a code,
   Associating to each movement that the entity could make, one or more sensors making it possible to detect or measure motion of the entity,
   Equipping the entity with an electronic unit containing the sensors associated with all the movements identified and that the entity could make,
   Detecting through the sensors the real movement made by the entity,
   Broadcasting the description and/or the code associated with the motion of the entity detected by the sensors associated with the motion of the entity to a detection module using means fitted to the electronic unit and making it possible to television-broadcast and/or radio-broadcast, in a unidirectional manner and without dialogue and in loops, the code or description associated with the motion of the entity, and
   wherein the television-broadcast and/or radio-broadcast loop is performed at frequencies ranging from 1 second to 120 seconds over very long distances ranging from 500 m to up to 20,000 m,
   wherein the television-broadcast and/or radio-broadcast can be done at a rate of 100 KB/s up to more than 10 GB/s and
   wherein the detection module is equipped with the reception means for receiving the audio or visual description and/or the code associated with the motion of the entity, and
   wherein the description is broadcast on a sound diffusion means equipping the detection module or displayed on a display means equipping the detection module or wherein the code is directed to an operating means for the purpose of decoding or of association with a movement through a database containing the codes associated with each possible feasible movement and wherein the description and/or code associated with the movement can be used for the purpose of controlling or auto-controlling means for controlling the motion of the entity.

* * * * *